(12) United States Patent
Winkler et al.

(10) Patent No.: US 6,450,057 B1
(45) Date of Patent: Sep. 17, 2002

(54) LOW-FRICTION GEARSHIFT DEVICE

(75) Inventors: Manfred Winkler, Aurachtal; Wolfgang Steinberger, Herzogenaurach; Rainer Schubel, Ansbach; Andreas Neudecker, Weisendorf; Wilfried Soyka; Reinhart Malik, both of Herzogenaurach, all of (DE)

(73) Assignee: INA Walzlager Schaeffler oHG (DE)

( * ) Notice: Subject to any disclaimer, the term of this patent is extended or adjusted under 35 U.S.C. 154(b) by 0 days.

(21) Appl. No.: 09/564,486

(22) Filed: May 4, 2000

(30) Foreign Application Priority Data

May 10, 1999 (DE) .......................... 199 21 623

(51) Int. Cl.⁷ .............................. F16B 7/00; F16D 3/64
(52) U.S. Cl. ................. 74/473.37; 74/473.1; 74/473.26
(58) Field of Search .......................... 74/473.1, 473.25, 74/473.26, 473.27, 473.28, 473.29, 473.3, 473.31, 473.32, 473.33, 473.34, 473.35, 473.36, 473.37, 527, 470; 192/82 R; 464/167, 168, 169

(56) References Cited

U.S. PATENT DOCUMENTS

| | | | | |
|---|---|---|---|---|
| 1,368,574 A | * | 2/1921 | Romney | 464/85 |
| 2,326,201 A | * | 8/1943 | Brumagim | 464/85 |
| 3,164,030 A | * | 1/1965 | Fodrea et al. | 74/473.26 |
| 4,449,416 A | * | 5/1984 | Huitema | 192/82 R |
| 4,520,686 A | * | 6/1985 | Renk | 74/473.37 |
| 4,529,080 A | * | 7/1985 | Dolan | 192/82 R |
| 4,704,916 A | * | 11/1987 | Wilhelmy | 74/527 X |
| 4,777,839 A | * | 10/1988 | Lindhom et al. | 74/473.37 X |
| 5,111,711 A | * | 5/1992 | Engel et al. | 74/473.37 |
| 5,136,893 A | * | 8/1992 | Wilhelmy | 74/473.37 |

FOREIGN PATENT DOCUMENTS

| | | | |
|---|---|---|---|
| DE | 4312997 | * | 10/1994 |
| DE | 19940733 | * | 3/2001 |
| EP | 0582804 | | 2/1994 |

\* cited by examiner

Primary Examiner—Thomas R. Hannon
Assistant Examiner—Colby Hansen
(74) Attorney, Agent, or Firm—Bierman, Muserlian and Lucas

(57) ABSTRACT

In a gearshift device (38) of a manual transmission comprising at least one transmitting means (2) that is arranged for pivoting and axial displacement relative to the transmission, a low-friction transmission of gearshift movements is achieved by the inclusion of a rolling bearing (47) taking up thrust loads.

4 Claims, 2 Drawing Sheets

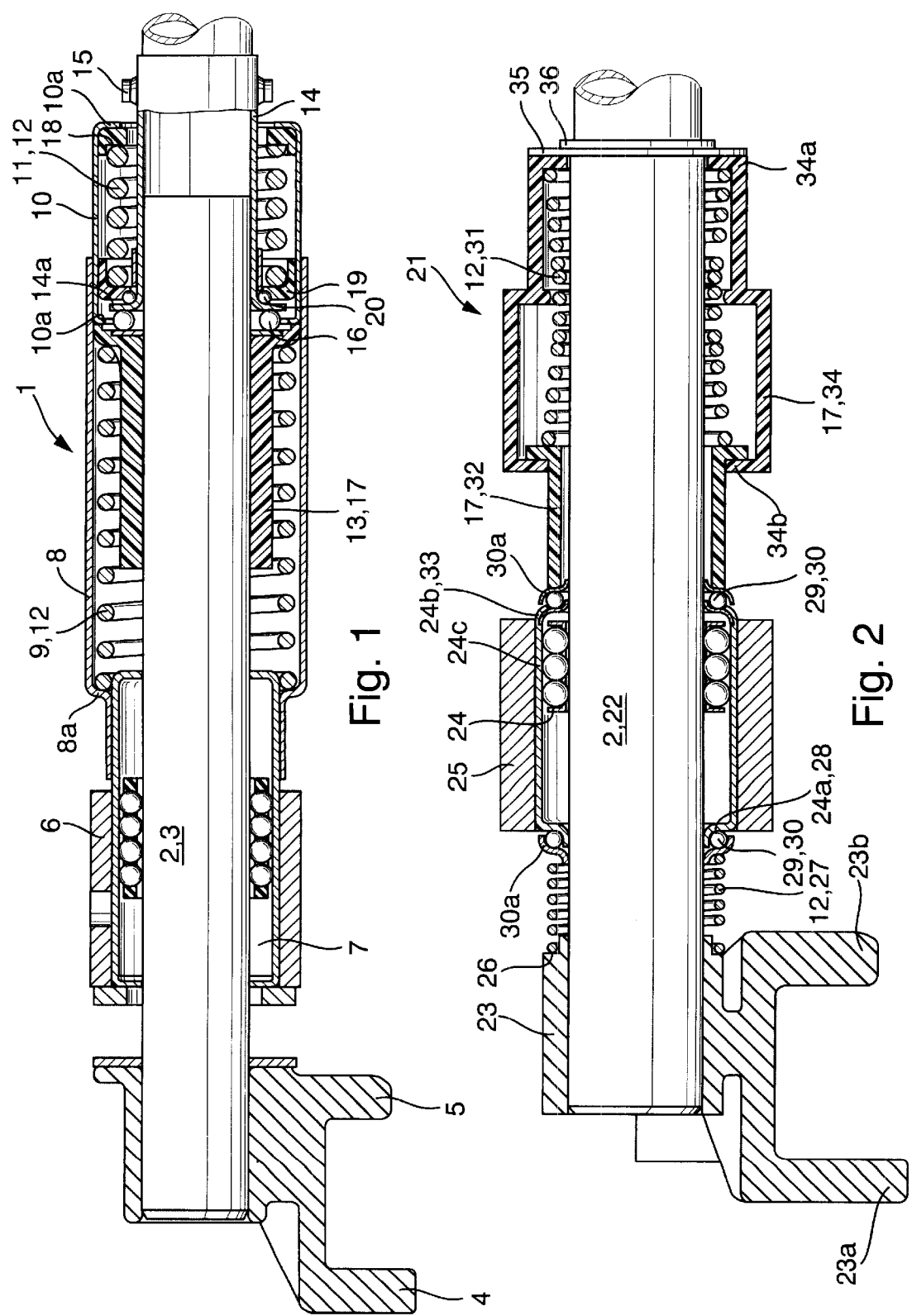

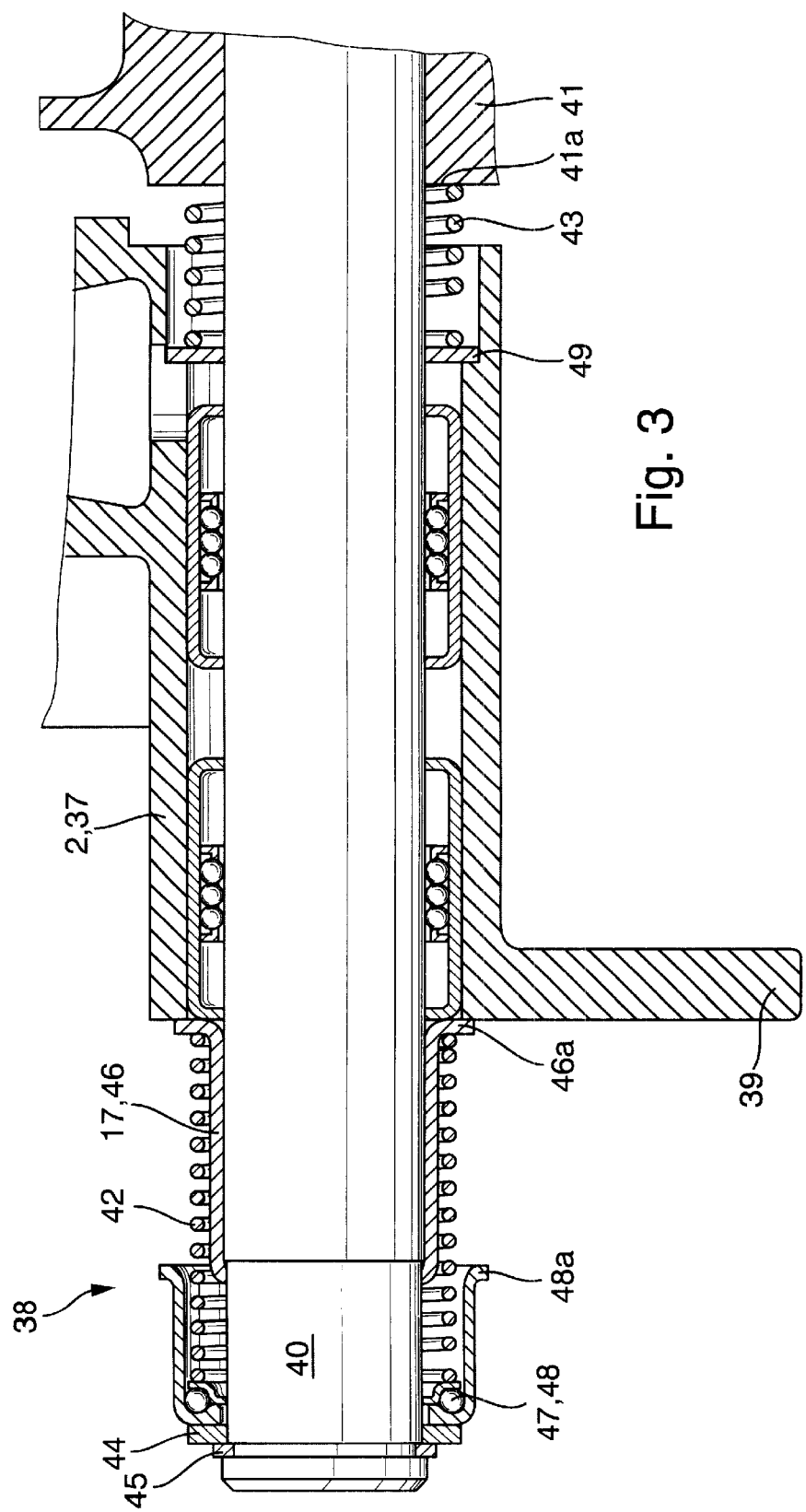

LOW-FRICTION GEARSHIFT DEVICE

FIELD OF THE INVENTION

The invention concerns a gearshift device of a manual transmission comprising:
- at least one transmitting means that is pivotable as well as axially displaceable relative to the manual transmission for transmission of gearshift movements,
- at least one biasing means that retains the transmitting means in an initial position, and after a gearshift movement, returns the transmitting means into the initial position,
- at least the biasing means acts axially directly or through at least one stop means on a first stop that is arranged secure against rotation relative to the transmission and on a second stop that is arranged for pivoting with the transmitting means.

BACKGROUND OF THE INVENTION

Gearshift devices of the pre-cited type are constituted, for example, of a gearshift shaft with at least one shift finger or by a gearshift sleeve. The gearshift shaft or the gearshift sleeve is the transmitting means on which one or more shift fingers are formed or arranged. The gearshift shaft or the gearshift sleeve transmits the gearshift movements initiated by a gearshift lever to a shift member which may be, for example, a catch of a sliding selector shaft into which the shift finger engages.

The transmitting means of modern manual transmissions transmits selecting and gearshift movements in both axial directions and in pivoting direction. For this purpose, the transmitting means is mounted in or on the transmission for axial movement relative to the transmission and for pivoting about its own longitudinal axis. The supports serving to mount gearshift shafts are generally arranged or formed on the transmission casing as mounting eyes which receive the gearshift shaft. For the mounting of gearshift sleeves, pins or shaft stubs are used on which the shaft sleeves are mounted for axial and pivoting motion.

As a rule, for the selection of a gear in the manual transmission, the transmitting means is moved out of an initial position into a gear-engaging position and, after a gearshift motion, it is moved back into the initial position by the force of one or more biasing means. The biasing means generally comprises compression springs. In the initial position, the transmitting means, or at least its transmitting members bear under spring load against an axial stop. If a gearshift device is designed for gearshift movements in both axial directions, the transmitting means is spring-loaded in both directions and bears against stops, each of which acts at least in one of these directions.

Frequently in gearshift devices in which gearshift movements are transmitted in both axial directions, one or more transmitting means are retained in their initial position by the forces of matched springs and stops acting in opposite directions. The transmitting means is retained by two or more oppositely acting springs in a neutral position resulting from the forces of the oppositely acting springs and stops. This neutral position corresponds to the initial position.

As already mentioned, the said spring or springs are supported on stops. One stop is fixed relative to the transmission at least in the direction of action of the supporting force of the spring. This stop can be formed or arranged directly on the transmission, or stop means are additionally arranged between the stop and the transmission. The other stop is formed or arranged either directly on the transmitting means or, again, separated by further stop means. At least some of the stops are fixed axially by fixing means relative to the transmission, or are fixed on the transmitting means. The stop means are formed, for example, by spacer sleeves that limit the travel of the transmitting means in axial direction.

In the above examples, in which gearshift shafts or gearshift sleeves are used, disc-shaped stops arranged on the gearshift shaft or on the pin or shaft stub are frequently secured by fixing means such as locking rings engaging into grooves or by grooved pins inserted into bores.

EP 05 82 804, for example, discloses a gearshift device in which a gearshift shaft is mounted in a transmission casing for axial and pivoting motion. Two stops are fixed on the gearshift shaft. The first stop comprises a transmitting means in the form of a shift finger and is retained in an initial position by a compression spring. In interaction with a support fixed on the transmission, the compression spring defines the position of the shift finger. The initial position of the gearshift shaft is defined by a further compression spring which is fixedly supported on the transmission and acts on a sheet metal pot. This sheet metal pot interacts, in its turn, with a third spring and with the second stop. The stops are fixed on the gearshift shaft by fixing pins, each of which is received in a bore of the gearshift shaft.

As already mentioned, the transmitting means executes a movement relative to the transmission. The biasing means, that is to say, the springs and the stop means, are arranged with pre-stress between the relatively movable transmitting means and the stops fixedly arranged on the transmission. The springs are supported by their spring ends on the stops or on the stop means. When as a result of a gearshift movement, the transmitting means pivots about its central longitudinal axis, a relative movement between the elements that are in contact with each other must take place at least one point of contact, i.e. at a point of contact between one of the stops and one of the said means, or at a point of contact between the said means. This relative movement produces friction. The magnitude of the friction force depends on the manner in which the mutually contacting elements are made, i.e. on the configuration of a spring end which bears against a stop and on the active pre-stress of the spring. A resistance depending on the friction force is offered to the pivoting movement of the transmitting means. Further resistance is produced by the twisting of the spring during the pivoting motion and by the variation in length of the spring.

The smoothness of the gearshift process in the transmission is negatively influenced by such types of resistance. The high demands made on the quality and comfort of gear selection in modern manual transmissions call for an improvement of prior art gearshift devices for the aforesaid reasons.

OBJECTS OF THE INVENTION

It is an object of the invention to provide a gearshift device in which the rotation between the relatively rotating elements during gear selection is rendered free of friction as far as possible.

This and other objects and advantages of the invention will become obvious from the following detailed description.

SUMMARY OF THE INVENTION

The invention achieves the above objects by the fact that at least one rolling bearing taking up at least thrust forces is arranged between at least one of the said stops and one of the said means. In this way, the relative movement taking place during gearshift movements is rendered free of friction at least one of the points of contact between the elements of a gearshift device by at least one rolling bearing. Such rolling bearings may be any types of ball, roller or needle bearings that can take up thrust forces.

In a preferred embodiment of the invention, the rolling bearing is an angular contact ball bearing. Besides the reduction of friction during gearshift movements, a further advantage of the use of angular contact ball bearings is the self-centering of the elements concerned relative to each other. Angular contact ball bearings having bearing rings made out of sheet metal by shaping or raceways made of plastic can be economically produced particularly in large-scale manufacturing.

In a further embodiment of the invention, one of the raceways of the rolling bearing is formed on one of the stops. The economization obtained with this measure is particularly high if the stop is made by shaping out of sheet metal.

According to still another feature of the invention, the gearshift device comprises a rolling bearing whose transmitting means is a gearshift shaft comprising at least one shift finger. The gearshift shaft is mounted for axial and pivoting movement in a bearing. The first stop is formed on this bearing. The biasing means is a compression spring arranged on the gearshift shaft. In one axial direction, the compression spring is supported on the first stop through a stop means configured as a spacer sleeve. In the other axial direction, the compression spring acts on the second stop that is arranged on the gearshift shaft. The rolling bearing is arranged between the first stop and the spacer sleeve or the compression spring. In an alternative arrangement, the compression spring is supported directly on the first stop and acts on a spacer sleeve that is seated, at least partially, between the compression spring and the second stop, the rolling bearing being arranged between the spacer sleeve and the second stop.

According to a further advantageous feature of the invention, an axially oriented rim of a bearing in the first of the aforesaid arrangements is configured as a raceway of the rolling bearing. The bearing which may be received, for example, in a mounting eye, forms the mounting element for the mounting of the gearshift shaft while also forming the first stop and the raceway of the rolling bearing. Such gearshift devices are economic to manufacture, especially if the rolling bearing is an angular contact ball bearing and the bearing, the stops and the rolling bearing are sheet metal parts made by shaping.

Finally, according to still another advantageous feature of the invention, the rolling bearing is arranged in a gearshift device whose transmitting means is a gearshift sleeve that is arranged for axial and pivoting movement on an axle. The axle is arranged fixedly relative to the transmission. The biasing means is formed by at least one compression spring arranged on the axle. In one axial direction, the compression spring is supported on the first stop that is arranged on the axle and, in the other axial direction, on the second stop that is arranged on the gearshift sleeve. The rolling bearing is arranged between the first stop and the compression spring.

The invention will now be described with reference to different examples of embodiment illustrated in the appended drawings.

BRIEF DESCRIPTION OF THE DRAWINGS

FIG. 1 shows an embodiment of a gearshift device of the invention having a transmitting means in the form of a gearshift shaft, FIG. 2 shows a further embodiment of a gearshift device of the invention having a transmitting means in the form of a gearshift shaft, FIG. 3 shows an embodiment of a gearshift device of the invention having a gearshift sleeve mounted on an axle.

DETAILED DESCRIPTION OF THE DRAWINGS

FIG. 1 shows a gearshift device 1 whose transmitting means 2 is formed by a gearshift shaft 3. Two shift fingers 4 and 5 are arranged on the gearshift shaft 3 which is mounted by a bearing 7 in a mounting eye 6. A first guide sleeve 8 is fixed on the bearing 7, and a biasing means 12 configured as a first compression spring 9 is guided in the first guide sleeve 8. A second guide sleeve 10 comprising end rims 10a is also received in the first guide sleeve 8. A further biasing means 12 in the form of a second compression spring 11 is guided in the second guide sleeve 10. The first compression spring 9 is supported in one axial direction on a first stop 8a formed in the first guide sleeve 8. The first compression spring 9 is prestressed and acts on a stop means 17 configured as a spacer sleeve 13. The spacer sleeve 13, in its turn, acts on a second stop 14 that is fixed by a grooved pin 15 on the gearshift shaft 3. A rolling bearing 16 is arranged between the spacer sleeve 13 and the second stop 14. One bearing ring of this rolling bearing 16 is formed by a radially outward extending collar 14a of the second stop 14. The axial travel of the gearshift shaft 3 is limited in the direction of action of the first compression spring 9 by the rim 10a of the second guide sleeve 10 against which the spacer sleeve 13 runs. The second compression spring 11 is supported through a spring plate 18 on the rim 10a and acts under pre-stress on a thrust member 19 which, in its turn, abuts against the second stop 14. A rolling bearing 20 is arranged between the thrust member 19 and the second stop 14. One bearing ring of this rolling bearing 20 is formed by the second stop 14.

FIG. 2 shows a gearshift device 21 whose transmitting means 2 is formed by a gearshift shaft 22 and a switching body 23. The switching body 23 comprises a first shift finger 23a and a second shift finger 23b and is fixed on the gearshift shaft 22. The gearshift shaft 22 is mounted by a bearing 24 for rotation and for limited axial displacement in a mounting eye 25. The biasing means 12 configured as a compression spring 27 is supported on a first stop 28 and acts on a second stop 26 formed on the switching body 23. The first stop 28 is formed by the first rim 24a of the bearing 24. A rolling bearing 29 configured as an angular contact ball bearing 30 is arranged between the first compression spring 27 and the first stop 28. One raceway of the angular contact ball bearing 30 is formed on the first rim 24a. The gearshift shaft 22 is loaded in the other direction by a second compression spring 31. The second compression spring 31 is supported on a further first stop 33 through a stop means 17 configured as a spacer sleeve 32. The further first stop 33 is formed by the second rim 24b of the bearing 24. A further stop means 17 serves as a stop sleeve 34 for limiting the path of axial displacement of the gearshift shaft 22. Through the first collar 34a of the stop sleeve 34, the second compression spring 31 loads a further second stop 35 that is secured by a locking ring 36 on the gearshift shaft 22. The limitation of the path of displacement of the gearshift shaft 22 is effected by the second collar 34b of the stop sleeve 34 and by the spacer sleeve 32. A further angular contact ball bearing 30 is arranged between the spacer sleeve 32 and the first stop 33. One raceway of the further angular contact ball bearing 30 is formed on the first stop 33. The outer rings 30a of the angular contact ball bearings 30 and the outer ring 24c of the bearing 24 are made by shaping out of sheet metal.

A gearshift device identified at 38 is illustrated in FIG. 3. The transmitting means 2 of this device is formed by a gearshift sleeve 37 having a shift finger 39. The gearshift sleeve 37 is mounted at two points on an axle 40 which is fixedly received in a transmission casing 41. The gearshift sleeve 37 is retained in its initial position by two biasing means 12 in the form of a first compression spring 42 and a second compression spring 43. The first compression spring 42 is supported on a first stop 44 that is secured in axial direction on the axle 40 by a locking ring 45. The first compression spring 42 acts through a stop means 17 on the gearshift sleeve 37. The stop means 17 is configured as a stop sleeve 46 that comprises a second stop 46a. The stop sleeve 46 limits the axial path of the gearshift sleeve 37. A rolling bearing 47 configured as an angular contact ball bearing 48 is arranged between the first compression spring 42 and the first stop 44. The outer ring 48a of the angular contact ball bearing 48 forms, at the same time, a guide sleeve for guiding the first compression spring 42. The second compression spring 43 acts on the gearshift sleeve 37 in a direction opposite to the direction of action of the first compression spring 42. The second compression spring 43 is supported under pre-stress on a first stop 41a formed on the transmission casing 41 and on a second stop 49 formed on the gearshift sleeve 37.

What is claimed is:

1. A gearshift device of a manual transmission comprising:

at least one transmitting means that is pivotable as well as axially displaceable relative to the manual transmission for transmission of gearshift movements, at least one first biasing means and at least one second biasing means, the first and second biasing means acting in opposite directions and retaining the transmitting means in an initial position, and after a gearshift movement, at least. one of the biasing means returns the transmitting means into the initial position, at least one of the biasing means acts axially directly or through at least one stop means on a first stop that is arranged secure against rotation relative to the transmission and on a second stop that is arranged for pivoting with the transmitting means, at least one rolling bearing taking up at least thrust forces is arranged between at least one of the said first and second stops and one of the said transmitting and biasing means, and one raceway of the rolling bearing is formed on one of the said first and second stops.

2. A gearshift device of claim 1 wherein the rolling bearing is an angular contact ball bearing.

3. A gearshift device of claim 1 wherein the transmitting means is formed by a gearshift shaft that comprises at least one shift finger and is mounted for pivoting and axial displacement in at least one bearing, the first stop is formed on the bearing, the biasing means is at least one compression spring arranged concentrically with the gearshift shaft, the stop means is at least a part of a spacer sleeve which extends in axial direction and is arranged at least partially between the first stop and the compression spring, and the rolling bearing is arranged between the first stop and the spacer sleeve.

4. A gearshift device of claim 3 wherein a raceway of the rolling bearing is formed on at least one rim of the bearing.

* * * * *